United States Patent [19]
Katsuragi

[11] 3,741,637
[45] June 26, 1973

[54] SHEET-SHAPED FILM HOLDING MECHANISM IN PROJECTOR

[75] Inventor: Mamoru Katsuragi, Osaka, Japan

[73] Assignee: Minolta Camera Kabushiki Kaisha, Osaka-shi, Osaka, Japan

[22] Filed: Mar. 19, 1971

[21] Appl. No.: 125,962

[30] Foreign Application Priority Data
Mar. 19, 1970 Japan.............................. 45/26319
Mar. 19, 1970 Japan.............................. 45/26320
Mar. 26, 1970 Japan.............................. 45/28987

[52] U.S. Cl. ................................. 353/120, 353/27
[51] Int. Cl. ...................... G03b 23/08, G03b 21/00
[58] Field of Search .................... 353/27, 120, 122; 40/106.1, 79

[56] References Cited
UNITED STATES PATENTS
3,344,705  10/1967  Gordon .............................. 353/23
3,409,361  11/1968  Hynes ................................ 353/27
2,335,697  11/1943  Reymiers ........................... 355/53
3,442,581   5/1969  Smitzer .............................. 353/27

FOREIGN PATENTS OR APPLICATIONS
1,347,044  11/1963  France ............................... 353/27

Primary Examiner—Louis R. Prince
Assistant Examiner—A. J. Mirabito
Attorney—Watson, Cole, Grindle & Watson

[57] ABSTRACT

A sheet-shaped film holding mechanism for use with a projector adapted for individually projecting the respective picture frames of a sheet-shaped film having a number of picture frames on one sheet, such as, for example, a microfiche or jacket film. The film carrier is particularly adapted to facilitate loading and removal of the sheet-shaped film and switching from one picture frame to another. The holding mechanism includes rollers adapted for flattening a sheet-shaped film held thereby and for holding the film in such flattened condition.

2 Claims, 5 Drawing Figures

PATENTED JUN 26 1973  3,741,637

INVENTOR.

BY Mamoru Katsuragi
Watson, Cole, Grindle & Watson

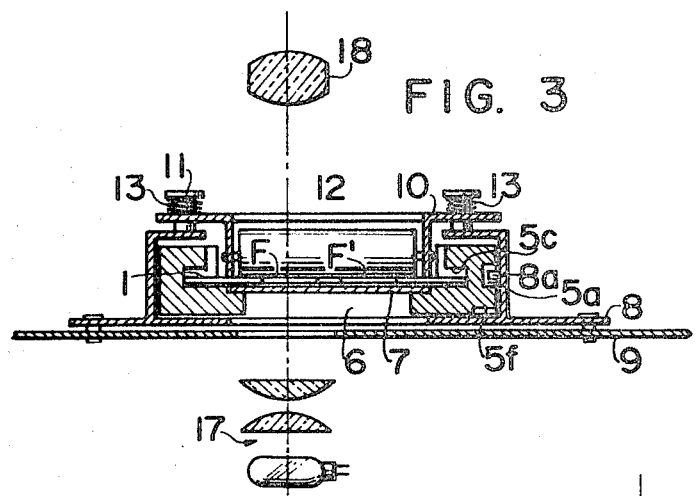
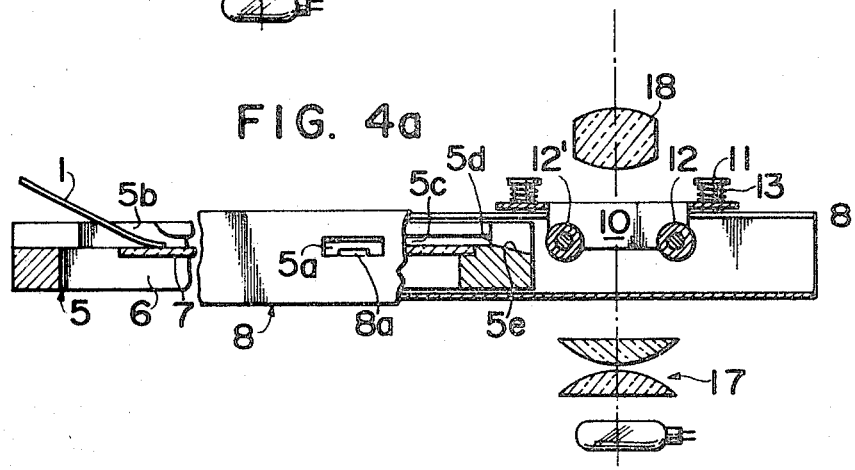
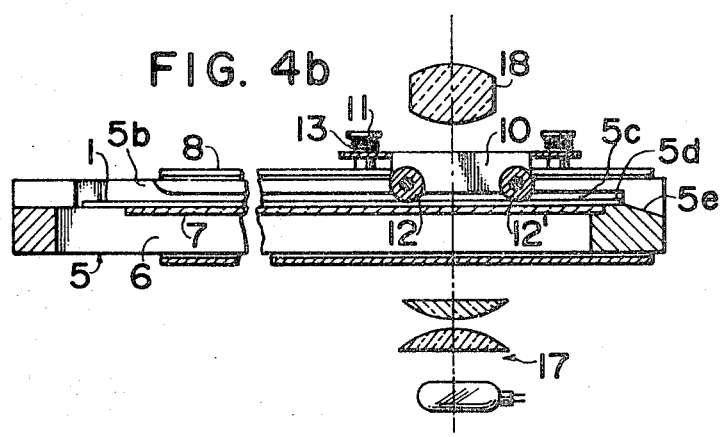

SHEET-SHAPED FILM HOLDING MECHANISM IN PROJECTOR

BACKGROUND OF THE INVENTION

The present invention relates to an improved film carrier for sheet-shaped films and particularly to an improved holding mechanism for use with such carriers.

In the past, projectors for sheet-shaped film were often equipped with carriers formed from two flat transparent plates adapted for holding a sheet-shaped film in a flattened condition therebetween. The insertion of a sheet-shaped film into such projector required the removal of the transparent plates from the projector and the manual handling of the plate to place the film therebetween. Accordingly, the plates were susceptible to the reception of fingerprints which could interfere with the projected image. Further, such plates did not usually include positioning means and therefore the positioning of the sheet-shaped film often required relatively long periods of time.

SUMMARY OF THE INVENTION

The present invention provides a carrier for a sheet-shaped film having a holding mechanism which facilitates the loading and removal of the sheet-shaped film from the carrier. The mechanism includes a pair of rollers positioned for pressing the sheet-shaped film against a transparent plate provided at the light transmission opening of the carrier and holding the sheet-shaped film in a flattened condition against the transparent plate. Thus, when the film carrier is removed from the carrier holding structure of the projector for the purpose of loading or unloading a sheet-shaped film, the relative positions of the sheet-shaped film and the carrier remain fixed.

An important object of the present invention is the provision of a film carrier having a holding mechanism which facilitates the loading and unloading of sheet-shaped films to and from the film carrier. The carrier is adapted for cooperative engagement with a holding structure on a projector and therefore, positioning of the carrier and the sheet-shaped film relative to the projector is also facilitated.

Another important object of the invention is the provision of a holding mechanism for such a film carrier capable of securely holding the sheet-shaped film in a flattened condition in the film carrier.

A further object of the present invention is the provision of a film carrier holding mechanism and a corresponding holding structure adapted to permit movement of the film carrier between a loading position and a projecting position and yet prevent complete removal of the film carrier from the holding structure so that loading and unloading of sheet-shaped film may be accomplished without complete removal of the carrier from its holding structure.

BRIEF DESCRIPTION OF THE DRAWINGS

FIG. 3 is a cross-sectional view taken substantially along line III—III of FIG. 2;

FIG. 4a is an elevational view, partly in cross-section, of the film carrier of the invention and the corresponding holding structure of a projector positioned to show the relationship between the carrier holding structure and the rollers of the holding mechanism of the carrier when the latter is in a loading position relative to the holding structure; and FIG. 4b is an elevational cross-sectional view similar to FIG. 4b showing the relationship between the carrier holding structure and the rollers when the film carrier is positioned in an operational position relative to the carrier holding structure.

DESCRIPTION OF THE PREFERRED EMBODIMENT

Figure 1:
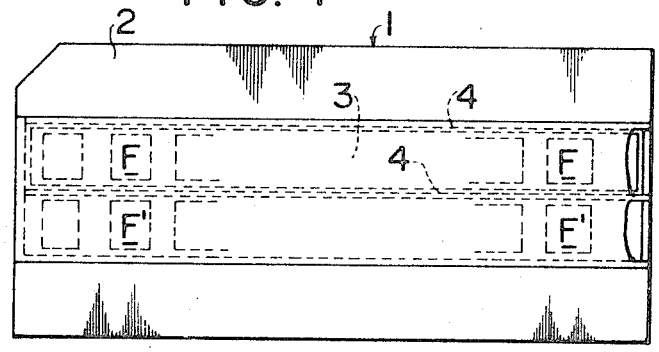
FIG. 1 is a top plan view of a jacket type sheet-shaped film with which the present invention is utilized.

FIG. 1 illustrates a jacket film 1 comprising film held in a film holder. Jacket film 1 is one example of a sheet-shaped film with which the present invention is used. Film jacket 1 comprises a base 2 made of a flexible transparent material. In base 2 are provided two lines F and F' of film pockets 4 into which filmstrips 3 have been inserted. The top and bottom edges of the film pockets include unfilled spaces respectively where the title and the like can be entered.

Figure 2:
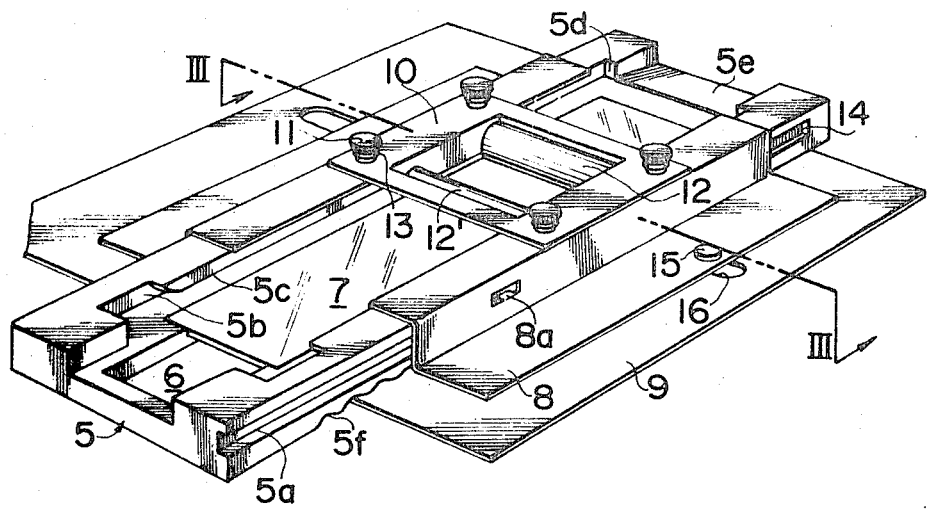
FIG. 2 is a perspective view of a film carrier having a holding mechanism embodying the principles and concepts of the present invention.

In FIGS. 2 and 3, a film carrier 5 constructed in accordance with the present invention is illustrated as comprising a rectangular frame body having inside dimensions which are co-extensive in size with a sheet-shaped film whereby the latter may be fixed therein. The carrier 5 is provided with a light transmission opening 6 sufficiently large to expose all of the picture frames of sheet-shaped film 1 to a source of light from a projector on which the carrier is mounted. A transparent plate 7 is mounted in spanning relationship to opening 6. Guide channels 5c are provided in the longitudinally extending frame sides of carrier 5 and the channels 5c have a vertical dimension which is slightly larger than the thickness of film sheet 1. Channels 5c extend from an inlet 5b of the carrier 5 to end face 5d as shown in the drawing. Inlet 5b of channel 5c is formed in arcuate shape as shown in the drawing to facilitate loading of sheet-shaped film 1 into and removal of the same from channel 5c. An elongated slot 5a is provided on the outer periphery of carrier 5 in a position for mated engagement with a projection 8a provided on a carrier holding frame 8. One end of slot 5a is open and the other end thereof is terminated by an abutment 14. When film carrier 5 is moved to the left in FIG. 2, the same will be partially removed from carrier holding frame 8 and abutment 14 of slot 5a will become engaged with projection 8a of holding frame 8. Thus, carrier 5 and frame 8 will be disposed relatively as shown in FIG. 4a. When carrier 5 is in this position, rollers 12 and 12' will be disposed to the right of film carrier 5, in spaced relationship to the latter.

A sloped surface 5e is formed at the righthand end of film carrier 5, as is shown in FIGS. 4a and 4b, to facilitate the riding of rollers 12 and 12' up onto the frame of carrier 5.

A wave form detent 5f having a wave length equal to the interval between the picture frames in the sheet-shaped film, is provided in the lower side of carrier 5 as shown in FIG. 2. Detent 5f is disposed to engage a protrusion (not shown in the drawings) mounted on carrier holding frame 8 for holding film carrier 5 at various positions which coincide with the positions of various picture frames of the sheet-shaped film.

Carrier holding frame 8 is mounted for sliding movement on a base plate 9 of a projector which is not shown in the drawings. For this purpose, a pin 15 carried by carrier 5 extends into a slot 16 in frame 8, which slot extends transversely of the direction of movement of carrier 5 in frame 8. Slot 16 is sufficiently long to permit lateral movement of film carrier 5 a distance equal to the spacing between picture frame rows F and F'.

Rollers 12 and 12' are carried by a roller holding frame 10 mounted on carrier holding frame 8 by means of pins 11. Springs 13 are interposed between the upper enlarged portion of each pin and frame 10 for pressing rollers 12 and 12' into contact with a sheet-shaped film 1 disposed on transparent plate 7. Rollers 12 and 12' are disposed for rotation on axes extending at right angles to the direction in which film carrier 5 slides in frame 8. Thus, a picture frame of row F of sheet-shaped film 1 and a picture frame of row F' thereof each appear between rollers 12 and 12'.

As can be seen in FIG. 3, a light source system designated by the reference numeral 17 comprises a bulb and a condenser lens in the projector. A projection lens is designated by the reference numeral 18.

In operation, as is shown in FIG. 4a, as film carrier 5 is moved to the left relative to carrier frame 8, sheet-shaped film 1 is moved out from under rollers 12 and 12'. When projection 8a of carrier holding frame 8 and abutment 14 of slot 5a on film carrier 5 are brought into engagement, further movement of carrier 5 is restrained and film carrier 5 is prevented from completely disengaging from carrier holding frame 8.

A sheet-shaped film 1 is inserted into guide channels 5c of film carrier 5 through inlet 5b. Smooth entry of the sheet-shaped film into guide channel 5c is facilitated by the arcuate shape of inlet 5b. The movement of the sheet-shaped film into carrier 5 is limited by contact between the end of sheet-shaped film 1 and end faces 5d of channel 5c. Thus, proper positioning of sheet-shaped film 1 relative to light transmission openings 6 is automatically established.

When carrier 5 is pushed into film carrier holding frame 8, rollers 12 and 12' ride smoothly up sloped surface 5e of film carrier 5 and onto the sheet-shaped film disposed on transparent plate 7 of film carrier 5. Thus, rollers 12 and 12' press sheet-shaped film 1 into close contact with transparent plate 7 and hold film 1 in a flattened condition. Then, as is shown in FIG. 4b, when a picture frame of film 1 moves into alignment with the projection portion of the projector, carrier 5 is held in position by detent 5f to maintain correct projection alignment. In order to project the next picture frame, film carrier 5 is pushed until the next detent position is encountered. In order to interchange picture frame row F with picture frame row F', carrier holding frame 8 is moved laterally on base plate 9. This movement, of course, is facilitated by the cooperation of pin 15 and slot 16.

In order to remove sheet-shaped film 1 from the projector after the projection thereof has been finished, film carrier 5 is moved to the left relative to carrier holding frame 8 and as a result of such movement, film carrier 5 moves out from under rollers 12 and 12'. Projection 8a of carrier holding frame 8 is contacted by abutment 14 of slot 5a to restrain further movement of film carrier 5. By pushing on the back side of transparent plate 7 with the fingers, sheet-shaped film 1 may be lifted to facilitate removal thereof from inlet 5b.

What is claimed is:

1. A sheet-shaped film holding mechanism in a projector comprising:

a film carrier provided with a light transmission opening covered by a transparent plate and a guide channel in which said transparent plate is fitted and wherein a sheet-shaped film may be detachably inserted;

a holding frame in which said film carrier is slidably fitted; and two rollers mounted springly on said holding frame so as to press a sheet-shaped film on said film carrier into contact with said transparent plate, said rollers being mounted for rotation about axes extending at right angles to the direction in which said film carrier slides, said carrier having an elongated slot formed on its outside edge, said slot being closed at one of its ends, there being a projection on the film carrier extending into the inside of said long slot, said projection being disposed for engaging the closed end of said slot for preventing the carrier from slipping out of the holding frame, said carrier being provided with a sloped camming surface on the end thereof adjacent the closed end of the slot said surface being disposed relative to said closed end such that when the projection of the holding frame engages the closed end, the rollers on the holding frame are in a position out of contact with the transparent plate of said film carrier and overlying the sloping surface whereby upon pushing the film carrier toward its film holding position, said rollers are moved along said surface and are pressed into contact with said transparent plate of the film carrier.

2. A sheet-shaped film holding mechanism for a projector comprising:

a film carrier having a light transmission opening and including a transparent plate disposed in covering relationship to said opening, said plate being of a size to underlie all frames of the pictures on a sheet-shaped film, said carrier having a channel disposed adjacent said transparent plate and extending therealong for substantially the entire length thereof, said channel being substantially the same width as the thickness of the sheet-shaped film and being provided at one end thereof with a notched inlet extending transversely of said channel and opening in a direction upwardly from the plane of said transparent plate for facilitating the insertion of a sheet-shaped film into the channel, said inlet having an arcuately shaped face disposed for guiding the sheet-shaped film into the channel, there being an end face at the opposite end of the channel from said inlet for restraining said sheet-shaped film against movement;

a holding frame slidably mounting said film carrier for movement relative thereto in a direction along said channel;

a pair of rollers rotatably mounted for rotation about axes extending generally perpendicularly of the sliding direction of said film carrier;

and yieldable means mounting the rollers on said holding frame for biasing the rollers against the sheet-shaped film and thereby the latter into contact with said transparent plate, said rollers being spaced to present an area therebetween having a width slightly larger than one frame width on the sheet-shaped film, said film carrier being provided with an elongated slot extending parallel to the direction of said channel, said slot having an abutment at the end thereof remote from said inlet to the channel, said holding frame having a projection extending into said slot and being disposed for contacting the abutment to prevent movement of the film carrier out of the holding frame when the film carrier is moved in a direction toward the inlet of its channel, said carrier also being provided with a sloped camming surface adjacent the end of the transparent plate remote from said inlet, said surface being disposed for releasing the sheet-shaped film from the pressure exerted thereagainst by said rollers as the carrier is moved in said direction toward said inlet.

* * * * *